(12) United States Patent
Lovie et al.

(10) Patent No.: US 7,974,507 B2
(45) Date of Patent: Jul. 5, 2011

(54) HIGH-FIBER-DENSITY OPTICAL FIBER CABLE

(75) Inventors: Ray Lovie, Hickory, NC (US); Jeffrey Scott Barker, Statesville, NC (US); William Mark Smartt, Mooresville, NC (US); Bob J. Overton, Lenoir, NC (US)

(73) Assignee: Draka Comteq, B.V., Amsterdam (NL)

( * ) Notice: Subject to any disclaimer, the term of this patent is extended or adjusted under 35 U.S.C. 154(b) by 119 days.

(21) Appl. No.: 12/557,086

(22) Filed: Sep. 10, 2009

(65) Prior Publication Data

US 2010/0067857 A1 Mar. 18, 2010

Related U.S. Application Data

(60) Provisional application No. 61/096,750, filed on Sep. 12, 2008, provisional application No. 61/113,146, filed on Nov. 10, 2008.

(51) Int. Cl.
*G02B 6/44* (2006.01)
(52) U.S. Cl. ......... 385/113; 385/100; 385/109; 385/112
(58) Field of Classification Search .................. 385/113, 385/100, 105, 106, 109, 111
See application file for complete search history.

(56) References Cited

U.S. PATENT DOCUMENTS

| | | | |
|---|---|---|---|
| 4,838,643 A | 6/1989 | Hodges et al. |
| 6,292,611 B1 | 9/2001 | Chamberlain et al. |
| 6,801,696 B2 | 10/2004 | Davis et al. |
| 6,813,422 B1 | 11/2004 | Krishnamurthy et al. |
| 6,912,347 B2 | 6/2005 | Rossi et al. |
| 7,356,234 B2 | 4/2008 | de Montmorillon et al. |
| 7,373,057 B2 | 5/2008 | Pizzorno et al. |
| 7,555,186 B2 | 6/2009 | Flammer et al. |
| 7,574,095 B2 | 8/2009 | Lock et al. |
| 7,587,111 B2 | 9/2009 | de Montmorillon et al. |
| 2002/0168155 A1 | 11/2002 | Rossi et al. |
| 2003/0099446 A1 | 5/2003 | Witt et al. |
| 2007/0104429 A1 | 5/2007 | Yokokawa et al. |
| 2007/0127878 A1 | 6/2007 | de Montmorillon et al. |
| 2007/0274647 A1 | 11/2007 | Pizzorno et al. |
| 2008/0317410 A1 | 12/2008 | Griffioen et al. |
| 2009/0003785 A1 | 1/2009 | Parris et al. |
| 2009/0175583 A1 | 7/2009 | Overton |
| 2009/0279835 A1 | 11/2009 | de Montmorillon et al. |

(Continued)

FOREIGN PATENT DOCUMENTS

EP 1369724 A2 12/2003

(Continued)

OTHER PUBLICATIONS

U.S. Appl. No. 61/096,750 filed Sep. 12, 2008.
U.S. Appl. No. 61/113,146 filed Nov. 10, 2008.
U.S. Appl. No. 60/986,737 filed Nov. 9, 2007.
U.S. Appl. No. 61/041,484 filed Apr. 1, 2008.

(Continued)

*Primary Examiner* — Brian M Healy
(74) *Attorney, Agent, or Firm* — Summa, Additon & Ashe, P.A.

(57) ABSTRACT

Disclosed is a fiber-optic cable that possesses a high cable filling coefficient (and/or a high cable fiber density) yet ensures that its enclosed optical fibers demonstrate improved attenuation performance when subjected to temperature variations between about −40° C. and 70° C. The fiber-optic cable is suitable for efficient installation into ducts, such as via blowing.

29 Claims, 1 Drawing Sheet

U.S. PATENT DOCUMENTS

| | | |
|---|---|---|
| 2009/0279836 A1 | 11/2009 | de Montmorillon et al. |
| 2010/0067855 A1* | 3/2010 | Barker .......................... 385/109 |
| 2010/0067857 A1 | 3/2010 | Lovie et al. |
| 2010/0092140 A1 | 4/2010 | Overton |

FOREIGN PATENT DOCUMENTS

| | | |
|---|---|---|
| EP | 1420279 A2 | 5/2004 |
| WO | 2009/062131 A1 | 5/2009 |

OTHER PUBLICATIONS

U.S. Appl. No. 61/112,595 filed Nov. 7, 2008.
U.S. Appl. No. 61/101,337 filed Sep. 30, 2008.
U.S. Appl. No. 61/112,006 filed Nov. 6, 2008.
U.S. Appl. No. 61/112,374 filed Nov. 7, 2008.
U.S. Appl. No. 60/969,401 filed Aug. 31, 2007.

* cited by examiner

HIGH-FIBER-DENSITY OPTICAL FIBER CABLE

CROSS-REFERENCE TO PRIORITY APPLICATIONS

This application claims the benefit of U.S. Patent Application No. 61/096,750 for a "High-Fiber-Density Optical Fiber Cable" (filed Sep. 12, 2008), and U.S. Patent Application No. 61/113,146 for a "High-Fiber-Density Optical Fiber Cable" (filed Nov. 10, 2008), each of which is incorporated by reference in its entirety.

FIELD OF INVENTION

The present invention relates to optical-fiber cables and, more generally, to electrical or other communication signal carriers. The present invention, for instance, embraces an optical-fiber cable design that is particularly suitable for blown installation into microducts.

BACKGROUND OF THE INVENTION

As compared with traditional wire-based networks, optical-fiber communication networks are capable of transmitting significantly more information at significantly higher speeds. Optical fibers, therefore, are being increasingly employed for communication networks.

To expand total transmission throughput, optical-fiber network providers are attempting to place ever more optical fibers in ever smaller spaces. Packing fibers into tight spaces can cause undesirable attenuation. Indeed, there is an inherent trade-off between increased fiber density and signal attenuation.

Commonly assigned U.S. Pat. No. 6,912,347 (Rossi et al.), which is hereby incorporated by reference in its entirety, achieves optical-fiber cables with high fiber counts and small cable diameters. Such optical-fiber cables are useful for installation into microducts.

Similarly, U.S. Patent Publication No. 2007/0274647 A1 (Pizzorno et al.), now U.S. Pat. No. 7,373,057, each of which is hereby incorporated by reference in its entirety, discloses an optical-fiber cable structure suitable for microduct installation. This publication requires the use of bend-insensitive fibers to reduce cable size.

Many optical-fiber cables designed for installation in microducts (e.g., via blowing) achieve high fiber counts and relatively small cable diameters. Such optical-fiber cables can achieve higher fiber densities, but the constituent buffer tubes have unsatisfactory mid-span storage performance as positioned in pedestals, cabinets, or other optical-fiber enclosures. By way of illustration, after installation in a microduct, an optical-fiber cable typically experiences temperature cycles during use. These temperature cycles can lead to signal attenuation. Thus, a fiber-optic cable that is less susceptible to attenuation is more suitable for such installations (e.g., installations requiring mid-span storage).

Despite efforts to achieve high-fiber-density optical-fiber cables that can be installed in microducts, a need continues to exist for an improved optical-fiber cable that not only possess high fiber count, but also is capable of satisfactory mid-span storage.

SUMMARY OF THE INVENTION

Accordingly, it is an object of the present invention to provide optical-fiber cables possessing high cable fiber densities while ensuring that the optical fibers enclosed therein demonstrate improved attenuation performance when subjected to temperature variations (e.g., between −40° C. and 70° C.).

It is another object of the present invention to provide optical-fiber cables that include standard single mode fibers (SSMF) at high packing densities (i.e., high fiber counts).

It is yet another object of the present invention to provide optical-fiber cables that include standard single mode fibers (SSMF) that are configured in buffer tubes within the cable in a way that promotes low attenuation.

It is yet another object of the present invention to provide optical-fiber cables that include standard single mode fibers (SSMF) that are capable of satisfactory mid-span storage over a wide range of temperatures.

It is yet another object of the present invention to provide optical-fiber cables that include at least 144 standard single mode fibers (SSMF) and that are configured in buffer tubes to provide reduced attenuation.

It is yet another object of the present invention to provide optical-fiber cables that include bend-improved or bend-tolerant optical fibers that are configured at exceptionally high packing densities in buffer tubes within the cable.

It is yet another object of the present invention to provide optical-fiber cables that include bend-insensitive optical fibers that are configured at exceptionally high packing densities in buffer tubes within the cable and yet are capable of satisfactory mid-span storage over a wide range of temperatures.

It is yet another object of the present invention to provide high-fiber-density optical-fiber cables (e.g., microcables) that are capable of efficient installation into ducts (e.g., microducts).

It is yet another object of the present invention to provide high-fiber-density optical-fiber cables (e.g., microcables) that can be readily pushed or blown into ducts or microducts to effect installation.

It is yet another object of the present invention to achieve a cabling deployment in which high-fiber-density optical-fiber cables (e.g., microcables) are positioned within one or more ducts or microducts.

It is yet another object of the present invention to achieve a cabling deployment in which high-fiber-density optical-fiber cables (e.g., microcables) are terminated at one or more commercially available pedestals, cabinets, or other optical-fiber enclosures.

It is yet another object of the present invention to achieve a cabling deployment in which the component buffer tubes of high-fiber-density optical-fiber cables (e.g., microcables) are positioned within one or more commercially available pedestals, cabinets, or other optical-fiber enclosures.

It is yet another object of the present invention to provide optical-fiber cables that meet the Telcordia Technologies generic requirements for optical fiber and optical-fiber cable as set forth in GR-20-CORE (Issue 3, May 2008).

The foregoing, as well as other objectives and advantages of the invention and the manner in which the same are accomplished, is further specified within the following detailed description and its accompanying figure.

DETAILED DESCRIPTION

Figure 1:
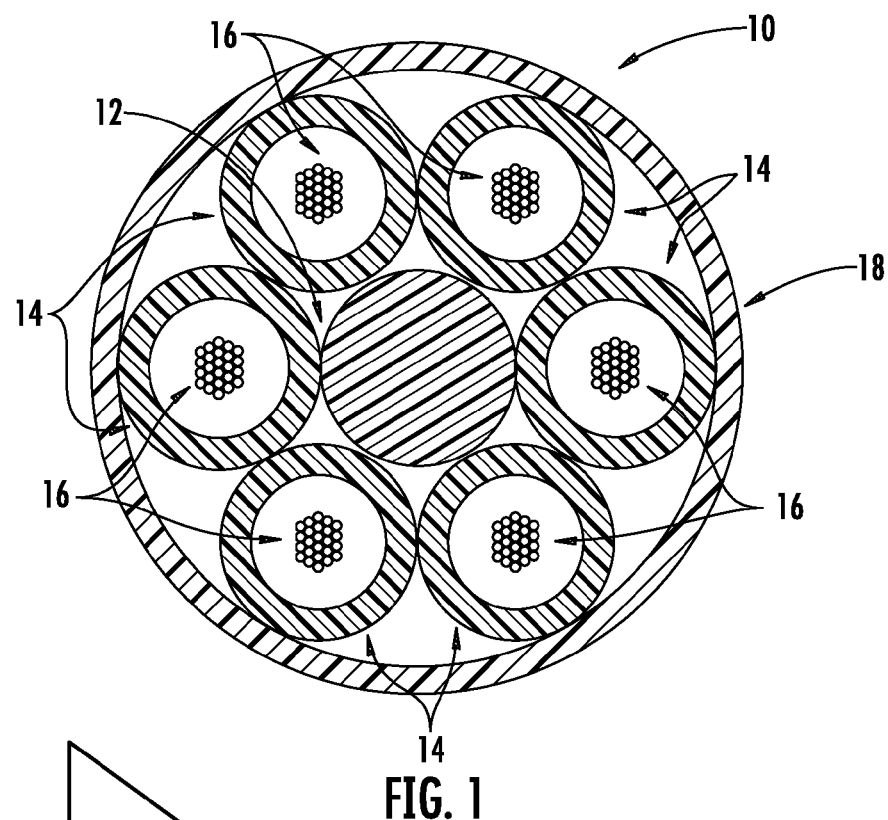
FIG. 1 schematically depicts a cross-sectional view of an exemplary embodiment of an optical-fiber cable in accordance with the present invention.

As noted, the invention embraces an optical-fiber cable having a high fiber count and yet being sufficiently compact to facilitate installation through microducts.

For example, an exemplary optical-fiber cable according to the present invention includes a plurality of buffer tubes (e.g., six or so) positioned within a cable jacket (e.g., a polymeric sheath). At least one of the buffer tubes includes a plurality of optical fibers (e.g., 24 optical fibers). More typically, each of the buffer tubes positioned within the cable jacket include optical fibers (e.g., six buffer tubes, each enclosing 24 optical fibers).

The optical fibers employed in an optical-fiber cable according to the present invention are typically conventional standard single-mode fibers (SSMF) possessing diameters of between about 235 microns and 265 microns (i.e., the combined diameter of the glass fiber and its coatings). That said, it is within the scope of the invention to employ optical fibers having smaller diameters (e.g., 200 microns or so). Suitable single-mode optical fibers (SSMF) that are compliant with the ITU-T G.652.D requirements are commercially available, for instance, from Draka Comteq (Claremont, N.C.). The respective ITU-T G.652 standards are hereby incorporated by reference in their entirety.

The optical-fiber cables according to the present invention meet or exceed certain Telcordia Technologies generic requirements for optical-fiber cables as set forth in GR-20-CORE (Issue 2, July 1998; Issue 3, May 2008), such as low-temperature and high-temperature cable bend (6.5.3), impact resistance (6.5.4), compression (6.5.5), tensile strength of cable (6.5.6), cable twist (6.5.7), cable cyclic flexing (6.5.8), mid-span buffer tube performance of stranded cable (6.5.11), temperature cycling (6.6.3), cable aging (6.6.4), cable freezing (6.6.5), and water penetration (6.6.7). These GR-20-CORE generic requirements (i.e., Issue 2, July 1998, and Issue 3, May 2008, respectively) are hereby incorporated by reference in their entirety.

Moreover, the optical-fiber cables according to the present invention possess outstanding performance when subjected to extreme temperature variations. In this regard, the present optical-fiber cables demonstrate exceptional resistance to attenuation as determined by temperature cycle testing. For example, under testing conditions modified from the U.S. Department of Agriculture's Bulletin 1753F-601 (PE-90) (Rural Electrification Administration), the present optical-fiber cables demonstrate mean increases in optical-fiber attenuation of less than 0.05 dB. Furthermore, each optical fiber that is enclosed within a buffer tube typically demonstrates increased optical-fiber attenuation of less than 0.1 dB.

To achieve low optical-fiber attenuation that satisfies mid-span temperature cycle testing, it is beneficial to employ low buffer tube fiber densities (i.e., the buffer tubes within the cabling should not be overfilled).

Though prior fiber-optic cabling has employed buffer tubes having relatively low buffer-tube fiber densities, the resulting fiber-optic cables have possessed relatively low cable fiber densities. Conversely, efforts to increase fiber densities within optical-fiber cables have heretofore required the corresponding use of high fiber densities within buffer tubes (i.e., increasing the fiber count within a buffer tube of a given cross-sectional area).

The optical-fiber cables of the present invention improve upon such past efforts by achieving both relatively high cable filling coefficients (and cable fiber densities) while preserving low buffer-tube filling coefficients (i.e., buffer-tube fiber densities). Accordingly, the optical fibers of the present invention demonstrate exceptional performance when subjected to mid-span temperature cycling testing.

As used herein, the term "cable filling coefficient" of an optical-fiber cable refers to the ratio of the sum of the cross-sectional areas of all of the optical fibers within the optical-fiber cable versus the inner cross-sectional area of the optical-fiber cable (i.e., defined by the inner boundary of the protective outer jacket). As used herein and unless otherwise noted, the term "cable filling coefficient" employs the inner cross-sectional area of the optical-fiber cable.

Conversely, the term "outer cable filling coefficient" specifically refers to the ratio of the sum of the cross-sectional areas of all of the optical fibers within the optical-fiber cable versus the outer cross-sectional area of the optical-fiber cable (i.e., defined by the outer boundary of the protective outer jacket).

Optical-fiber cables of the present invention have relatively high cable fill ratios (i.e., cable filling coefficients). Optical-fiber cables having higher fill ratios are desirable, because they increase the amount of information that can be passed through a cable while decreasing the amount of space that the optical-fiber cable requires for installation.

As used herein, the term "cable fiber density" of an optical-fiber cable refers to the ratio of the total number of optical fibers within the optical-fiber cable versus the cross-sectional area of the optical-fiber cable as defined by the outer boundary of the protective outer jacket. Optical-fiber cables of the present invention have relatively high cable fiber densities. Optical-fiber cables having higher cable fiber densities are desired, because such high-fiber-density cables have an increased number of optical fibers and/or require less space for installation.

As used herein, the term "buffer-tube filling coefficient" refers to the ratio of the total cross-sectional area of the fibers within a buffer tube versus the inner cross-sectional area of that buffer tube (i.e., defined by the inner boundary of the buffer tube). Optical-fiber cables of the present invention include buffer tubes having a relatively low buffer-tube filling coefficient.

Alternatively, to the extent that non-circular buffer tubes are used, the longest inner cross-sectional width of the buffer tube can be used to define the diameter of a theoretical circularized buffer tube cross-sectional area (e.g., $\pi(D_{max}/2)^2$). As used herein, the term "circularized buffer-tube filling coefficient" refers to the ratio of the total cross-sectional area of the optical fibers enclosed within buffer tubes versus the sum of the theoretical circularized cross-sectional areas of the buffer tubes containing those optical fibers.

The circularized buffer-tube filling coefficient is one convenient way to characterize the cross-sectional area of an irregularly shaped buffer tube. Those having ordinary skill in the art will appreciate that for all but circular buffer tubes, the buffer-tube filling coefficient and the circularized buffer-tube filling coefficient are unequal.

Additionally, as used herein, the term "cumulative buffer-tube filling coefficient" refers to the ratio of the total cross-sectional area of the optical fibers enclosed within buffer tubes versus the sum of the inner cross-sectional areas of the buffer tubes containing those optical fibers.

Generally, optical-fiber cables with higher buffer-tube filling coefficients are more susceptible to attenuation over the length of the optical-fiber cable. Cables containing buffer tubes having a lower buffer-tube filling coefficient are less susceptible to attenuation when subjected to temperature cycles and are more suitable for mid-span storage. In particular, optical-fiber cables having lower buffer-tube filling coefficients meet the minimum specifications of the mid-span temperature cycle test. Therefore, the optical-fiber cables of the present invention are less susceptible to attenuation and are more suitable for mid-span storage.

It would seem that (i) increasing cable fiber filling coefficients (and accompanying high fiber density) and (ii) reducing buffer-tube filling coefficients are conflicting objectives. Nonetheless, the optical-fiber cable of the present invention achieves these goals.

Fiber-optic cables suitable for mid-span storage are typically subjected to a mid-span temperature cycle test, which assures certain minimum performance specifications for fiber-optic cables. As noted, one such test can be found in Bulletin 1753F-601 (PE-90) from the United States Department of Agriculture Rural Electrification Administration, which is hereby incorporated by reference in its entirety, an excerpt of which is provided as Appendix I in priority U.S. Patent Application Nos. 61/096,750 and 61/113,146.

As used herein and unless otherwise specified, reference to the "mid-span test," the "mid-span temperature cycle test," or the "temperature cycle test" refers the testing procedures set forth in the USDA Rural Electrification Administration mid-span standard, which is outlined as follows:

According to the USDA Rural Electrification Administration mid-span standard, buried and underground loose tube single mode cables intended for mid-span applications with tube storage should meet the following mid-span test without exhibiting an increase in fiber attenuation greater than 0.1 dB and a maximum average increase over all fibers of 0.05 dB.

Initially, the test section of the optical-fiber cable is installed in a commercially available pedestal or enclosure (or in a device that mimics their performance) as follows: A length of the protective outer jacket, equal to the mid-span length (e.g. 20 feet), is removed from the middle of the test specimen to allow access to the buffer tubes. All binders, tapes, strength members, etc. are removed. The buffer tubes are left intact. The cable ends defining the ends of the mid-span length are properly secured in the enclosure (i.e., as they would be secured within an enclosure in regular commercial use). The strength members are secured with an end stop type clamp and the protective outer jacket is clamped to prevent slippage. A minimum of 6.096 meters (20 feet) of cable extends from the entry and exit ports of the enclosure (i.e., 20 feet of the cable remain outside of the enclosure), so that optical measurements may be taken. Typically, the buffer tubes are wound in a coil with a minimum width of three (3) inches and minimum length of 12 inches. The exposed buffer tubes are loosely constrained during the test.

The enclosure, with installed cable, is placed in an environmental chamber for temperature cycling. It is acceptable for some or all of the two 20-foot (6.096 meters) cable segments (i.e., the cable segments that remain outside of the enclosure) to extend outside the environmental chamber.

Lids, pedestal enclosures, or closure covers should be removed if possible to allow for temperature equilibrium of the buffer tubes.

The attenuation of the optical fibers is measured at 1550±10 nanometers. The supplier of the optical-fiber cable must certify that the performance of lower specified wavelengths complies with the mid-span performance requirements.

After measuring the attenuation of the optical fibers, the cable is tested per the FOTP-3 temperature-cycling standard. Temperature cycling, measurements, and data reporting must conform to the FOTP-3 standard. The test is conducted for at least five complete cycles. The following detailed test conditions are applied (i.e., using the environmental chamber) to the enclosure containing the optical-fiber cable: (A) loose tube single mode optical cable sample shall be tested; (B) an 8-inch to 12-inch diameter optical buried distribution pedestal or a device that mimics their performance shall be tested; (C) mid-span opening for installation of loose tube single mode optical cable in pedestal shall be 6.096 meters (20 feet); (D) three hours soak time (i.e., exposure time); (E) Test Condition C-2, minimum −40° C. (−40° F.) and maximum 70° C. (158° F.); (F) a statistically representative amount of transmitting fibers in all express buffer tubes passing through the pedestal and stored shall be measured; and (G) the buffer tubes in the enclosure or pedestal shall not be handled or moved during temperature cycling or attenuation measurements.

Fiber cable attenuation measured through the exposed buffer tubes during the last cycle at −40° C. (−40° F.) and +70° C. (158° F.) should not exceed a maximum increase of 0.1 dB and should not exceed a 0.05 dB average across all tested fibers from the initial baseline measurements. At the conclusion of the temperature cycling, the maximum attenuation increase at 23° C. from the initial baseline measurement should not exceed 0.05 dB in order to allow for measurement noise that may be encountered during the test. The cable should also be inspected at room temperature at the conclusion of all measurements. The cable should not show visible evidence of fracture of the buffer tubes nor show any degradation of the exposed cable assemblies.

Embodiments of optical-fiber cables according to the present invention have undergone the mid-span temperature cycle test described (above) and fulfilled the minimum performance specification of the USDA Rural Electrification Administration mid-span standard. Additionally, these embodiments were subjected to harsher conditions than required by the USDA Rural Electrification Administration mid-span standard. For example, embodiments of the present invention were soaked at 70° C. for 14 hours, which is longer than the three hours required by the testing conditions set forth in the aforementioned USDA bulletin. Typically, under these harsher conditions only one temperature cycle is performed.

In this regard, it has been observed that attenuation for the initial temperature cycle tends to be higher than for subsequent temperature cycles. This counterintuitive observation means that testing over one cycle yields higher tested attenuation levels than testing over multiple temperature cycles (e.g., five or more as set forth in the USDA Rural Electrification Administration mid-span standard).

This modified mid-span standard is hereinafter referred to as the "modified USDA Rural Electrification Administration mid-span standard." A longer soak time (i.e., exposure time) may alter the deformation of the buffer tubes because of post-extrusion shrinkage differences at this temperature (i.e., the buffer tubes may shrink in length because of the amorphous orientation generated during the extrusion process and/or crystallization).

Embodiments of the present invention also passed a mid-span temperature cycle test with conditions similar to FOTP-3 with the exception that the soak time at −40° C. was reduced from three hours to one hour. This change of conditions probably did not affect the results of the test because the change in dimensions of the buffer tubes at low temperatures should be exclusively due to the coefficient of expansion (i.e., reversible thermal contraction and expansion).

Optical-fiber cables in accordance with the present invention should meet the minimum performance specifications required by the USDA Rural Electrification Administration mid-span standard.

Another mid-span standard is defined by Telcordia Technologies generic requirements for optical-fiber cables as set forth in GR-20-CORE (Issue 2, July 1998; Issue 3, May 2008; Mid-Span Buffer Tube Performance of Stranded Cable—6.5.11), which is hereby incorporated by reference in its entirety and hereinafter referred to as the "GR-20-CORE mid-span standard." This GR-20-CORE mid-span standard is less rigorous than the foregoing mid-span temperature cycle test standard defined by the United States Department of Agriculture Rural Electrification Administration. Accordingly, the optical-fiber cables that meet the aforementioned Rural Electrification Administration's mid-span temperature cycle test should also meet or exceed the GR-20-CORE mid-span standard.

To satisfy the GR-20-CORE generic requirements with mid-span buffer tube performance, loose tube single mode cables should exhibit an average change in fiber attenuation of no more than 0.15 dB at 1550 nanometers after mid-span testing. According to the generic requirements for optical-fiber cables as set forth in GR-20-CORE (Mid-Span Buffer Tube Performance of Stranded Cable—6.5.11), "[s]tranded loose-tube cables designed to have loose tubes stored in a pedestal or closure shall be capable of having a minimum of 14 feet of expressed buffer tube stored in a pedestal or closure in normal outside plant conditions without experiencing any unacceptable loss in the optical fibers stored in the expressed tubes."

In view of the foregoing and as noted, exemplary optical-fiber cables according to the present invention include a plurality of buffer tubes positioned within a polymeric cable jacket. In one exemplary embodiment, the optical-fiber cable includes 144 optical fibers apportioned across six buffer tubes (e.g., six buffer tubes each enclosing 24 optical fibers).

The optical-fiber cables according to the present invention typically possess cable filling coefficients of at least about 0.08, more typically cable filling coefficients of at least about 0.09 (e.g., about 0.95 or more). In some embodiments, optical-fiber cables possess cable filling coefficients of at least about 0.10 (e.g., about 0.11 or more).

Similarly, optical-fiber cables according to the present invention typically possess cable fiber densities of at least about 1.5 fibers/$mm^2$, more typically cable fiber densities of at least about 1.65 fibers/$mm^2$ (e.g., about 1.66 fibers/$mm^2$ or more).

At the same time, the optical-fiber cables according to the present invention typically include one or more buffer tubes possessing a buffer-tube filling coefficient of less than about 0.6, more typically 0.4 (e.g., about 0.35 or less). In some embodiments, optical-fiber cables include one or more buffer tubes possessing a buffer-tube filling coefficient of less than about 0.33 (e.g., about 0.31 or less). In other embodiments, optical-fiber cables include one or more buffer tubes possessing a buffer-tube filling coefficient of less than about 0.29 (e.g., about 0.28 or less).

Those having ordinary skill in the art will appreciate that to the extent that the optical fibers in the fiber-optic cable are equally apportioned among the same-sized buffer tubes, the buffer-tube filling coefficient for the particular buffer tubes will equal the optical-fiber cable's cumulative buffer-tube filling coefficient. That said, it is within the scope of the present invention to unequally apportion optical fibers within the plurality of buffer tubes. Similarly, it is within the scope of the present invention to include within the fiber-optic cables one or more optical fibers that are not enclosed within a buffer tube.

In accordance with the foregoing, the optical-fiber cables according to the present invention typically include buffer tubes that possess circularized buffer-tube filling coefficients of less than about 0.6 (e.g., about 0.30 to 0.45, and even less).

A particular embodiment of the present optical-fiber cable includes a plurality of buffer tubes positioned within a polymeric sheath (i.e., the cable jacket). Each buffer tube encloses a plurality of optical fibers (e.g., 24 optical fibers), such that the optical-fiber cable possesses a cable filling coefficient of at least about 0.09 and a cumulative buffer-tube filling coefficient of less than about 0.35.

Yet another embodiment of the present optical-fiber cable includes a plurality of buffer tubes positioned within a polymeric sheath (i.e., the cable jacket). Each buffer tube encloses a plurality of optical fibers (e.g., 24 optical fibers), such that the optical-fiber cable possesses a cable fiber density of at least about 1.65 fibers/$mm^2$ and a cumulative buffer-tube filling coefficient of less than about 0.35.

With reference to FIG. 1, the optical-fiber cable 10 of the present invention may be installed not only in traditional undergrounds ducts (i.e., ducts having an inner diameter of around 32 millimeters) but also in microducts (i.e., ducts having an inner diameter of 15 millimeters or less). Typically, microducts have an inner diameter of 13 millimeters or less.

In general, to achieve satisfactory long-distance blowing performance (e.g., between about 3,000 to 5,000 feet or more), the outer cable diameter of an optical-fiber cable 10 should be no more than about 70 to 80 percent of the microduct's inner diameter. For example, an optical-fiber cable 10 that is to be installed via a blowing method in a microduct having an inner diameter of 13 millimeters should have an outer diameter of between about 9 millimeters and about 10.5 millimeters.

In accordance with the foregoing, the optical-fiber cable 10 of the present invention is constructed as a loose tube cable. An optical-fiber cable 10 with a loose tube structure typically includes: a central strength member 12 having a compressive stiffness that inhibits substantial contraction of the cable 10; a number of buffer tubes 14 (e.g. loose tubes) arranged around the central strength member 12 and containing loosely placed optical fibers 16; and a protective outer jacket 18. An exemplary protective outer jacket has a thickness of between about 0.4 millimeter and 1.0 millimeter (e.g., about 0.6 millimeter).

Additional elements may be placed within the buffer tubes 14 between the interior walls of the buffer tubes 14 and the enclosed optical fibers 16. Alternatively, elements may be placed outside the buffer tubes 14 between the respective exterior walls of the buffer tubes 14 and the interior wall of the cable jacket. For example, yarns or fabrics (e.g., tapes) containing water-swellable material and/or coated with water-swellable powders (e.g., including super-absorbent polymers (SAPs)) may be employed.

The buffer tubes 14 may also contain a thixotropic composition (e.g., grease or grease-like gels) between the optical fibers 16 and the interior walls of the buffer tubes 14. Such compositions are understood by those having ordinary skill in the art.

The present invention also embraces dry cable structures (i.e., grease-free buffer tubes). Exemplary buffer tube structures that are free from thixotropic filling greases are disclosed in commonly assigned U.S. patent application Ser. No. 12/146,588 (Parris et al.), now published as U.S. Patent Application Pub. No. 2009/0003785, each of which is hereby incorporated by reference in its entirety.

To preserve the integrity of the signal transported by optical-fiber cables 10, certain design factors warrant consideration. First, forces may develop on the optical fibers 16 because of contact with rough, hard, or uneven surfaces within the optical-fiber cable 10. Such contact, for example, may result from thermal cable expansion or contraction, which can cause microbending and macrobending. This, in turn, can lead to signal attenuation or signal loss. Layers of protective coatings and claddings around the optical fibers 16 can help to reduce the forces that cause these unwanted effects.

Second, the optical fibers 16 are typically coupled to the surrounding buffer tube 14 in some way. This coupling prevents the optical fibers 16 from pulling back inside the buffer tube 14 as a result of processing, installation, handling, or thermally induced dimensional changes. Not only can these effects hamper accessibility to the fibers 16 during connection operations (e.g., splicing), but also insufficient coupling can lead to excess and/or unevenly distributed optical fiber length (e.g., optical fibers 16 accumulating in a confined space). Such accumulation may cause bending or otherwise force contact between the optical fibers 16 and other cable elements, which can likewise lead to microbending and macrobending.

Third, optical-fiber cables 10 are typically used with electronic devices. If water intruding into the cables 10 can spread (e.g., flow) along the length of the cables 10 to these electronic devices, severe damage to the electronic systems may result. It is also thought that the formation of ice within an optical-fiber cable 10 can impose onto the optical fibers 16 localized microbend-inducing forces or macrobend-inducing forces. Fillers and water-blocking layers within the cables 10 can impede the movement of water within the cables 10 and thereby limit such damage.

The undesirable effects of signal loss, coupling failure, and water damage can be reduced through the use of protective layers and coupling elements. The addition of these layers, however, can lead to larger cables 10, which are not only more costly to produce and store but also heavier, stiffer, and thus more difficult to install.

Manufacturers have typically addressed these problems by employing water-blocking, thixotropic compositions (e.g., grease or grease-like gels). For example, filling the free space inside a buffer tube 14 with water-blocking, petroleum-based filling grease helps to block the ingress of water. Further, the thixotropic filling grease mechanically (i.e., viscously) couples the optical fibers 16 to the buffer tube 14. That usefulness notwithstanding, such thixotropic filling greases are relatively heavy and messy, thereby hindering connection and splicing operations. Consequently, filling greases carry certain disadvantages.

In some embodiments, additional elements (e.g., a mechanical reinforcing layer such as a glass thread or aramid thread) may be placed between the buffer tubes 14 and the protective outer jacket 18. Typically, the buffer tubes 14 are wrapped in a binder (e.g., a water-swellable binder or tape) to facilitate assembly. In such embodiments, the protective outer jacket 18 is placed around the binder and buffer tubes 14.

Positioning the strength member 12 in the center of the optical-fiber cable 10 (i.e., centrally positioned within the annular space defined by the protective outer jacket 18) facilitates blowing performance. This central positioning of the strength member 12 balances the cable bending and axial stiffness of the optical-fiber cable 10. In this regard, when an optical-fiber cable 10 is installed (e.g., via blowing), it is desirable for the cable 10 to exhibit low bending stiffness such that the cable 10 will readily pass though bends or turns in the duct, yet also have enough stiffness to be pushed into the duct without folding or buckling. The use of a central strength member 12 helps to minimize the bending stiffness, yet ensures that the axial stiffness is sufficient enough such that the cable 10 will not buckle in the duct.

In some embodiments, the central strength member 12 of the optical-fiber cable 10 of the present invention has an outer diameter of between one and five millimeters. Typically, the central strength member 12 has an outer diameter of between two and four millimeters. As will be known by those having ordinary skill in the art, central strength members 12 may be formed from glass-reinforced plastic. In this regard, exemplary glass-reinforced plastic (GRP) might include between about 80 and 90 weight-percent glass Optical-fiber cables 10 according to the present invention typically contain 144 or more optical fibers 16, but certainly can contain fewer provided the overall cable fiber density is maintained.

The optical fibers 16 may include bend-tolerant (e.g., bend-insensitive) optical fibers. Typically, optical-fiber cables 10 including bend-insensitive optical fibers have higher buffer-tube filling coefficients (e.g., by having a higher fiber count, or by having smaller diameter buffer tubes 14) than optical-fiber cables 10 including standard optical fibers 16. Bend-insensitive optical fibers perform better (i.e., are less susceptible to attenuation) than standard optical fibers 16 in the mid-span temperature cycle test at high buffer-tube filling coefficients.

As noted, exemplary single-mode glass fibers for use in the present invention are commercially available from Draka Comteq (Claremont, N.C.) under the trade name BendBright®, which is compliant with the ITU-T G.652.D requirements.

That said, it is within the scope of the present invention to employ bend-insensitive glass fiber that meets the ITU-T G.657.A standard and/or the ITU-T G.657.B standard, each of which is hereby incorporated by reference in its entirety. In this regard, exemplary bend-insensitive single-mode glass fibers for use in the present invention are commercially available from Draka Comteq (Claremont, N.C.) under the trade name BendBright$^{XS}$®, which is compliant with both the ITU-T G.652.D and ITU-T G.657.A/B requirements. BendBright$^{XS}$® optical fibers demonstrate significant improvement with respect to both macrobending and microbending.

As set forth in U.S. Patent Application No. 60/986,737 for a "Microbend-Resistant Optical Fiber" (Overton), U.S. Patent Application No. 61/041,484 for a "Microbend-Resistant Optical Fiber" (Overton), U.S. Patent Application No. 61/112,595 for a "Microbend-Resistant Optical Fiber" (Overton), International Patent Application Publication No. WO 2009/062131 A1 and its related International Patent Application No. PCT/US08/82927 for a "Microbend-Resistant Optical Fiber" (Overton), and U.S. Patent Application Publication No. US 2009/0175583 and its related U.S. patent application Ser. No. 12/267,732 for a "Microbend-Resistant Optical Fiber" (Overton), each patent document of which is hereby incorporated by reference in its entirety, pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× as compared with a single-mode fiber employing a conventional coating system). Accordingly, it is further within the scope of the present invention to employ microbend-insensitive glass fiber.

In this regard, microbending can be analyzed according to the IEC fixed-diameter sandpaper drum test (i.e., IEC TR62221, Method B, 40-micron grade sandpaper), which provides a microbending stress situation that affects single-mode fibers even at room temperature. The IEC TR62221 microbending-sensitivity technical report and standard test procedures (e.g., IEC TR62221, Method B (fixed-diameter sandpaper drum) and Method D (basketweave)) are hereby incorporated by reference in their entirety.

In accordance with the foregoing, at wavelengths between 1200 nanometers and 1700 nanometers (e.g., 1550 nanometers or 1625 nanometers), microbend-insensitive optical fibers can possess spectral attenuation added losses of less than about 0.1 dB/km (e.g., about 0.05 dB/km or less) as measured in accordance with IEC TR62221, Method B (40-micron grade sandpaper). In contrast, at wavelengths between 1200 nanometers and 1700 nanometers (e.g., 1550 nanometers or 1625 nanometers), conventional, standard single-mode optical fibers (SSMF) might possess spectral attenuation added losses of more than about 0.25 dB/km, typically more than about 0.3 dB/km (about 0.4 dB/km or more) as measured in accordance with IEC TR62221, Method B (40-micron grade sandpaper).

Without being bound to any theory, it is believed that using bend-insensitive optical fibers in the fiber-optic cables according to the present invention would make practicable even higher cable filling coefficients (and cable fiber densities, too). By way of non-limiting example, employing bend-insensitive optical fibers might facilitate the achievement of cable filling coefficients of at least about 0.13 (e.g., between about 0.16 and 0.24), and perhaps 0.30 or more, and cable fiber densities of about 2.5 fibers/mm$^2$ (e.g., between about 2.9 fibers/mm$^2$ and 3.4 fibers/mm$^2$) and perhaps 4.0 fibers/mm$^2$ or more. In such super-high-density cable configurations, the cumulative buffer-tube filling coefficients, for example, may fall between about 0.4 and 0.75.

In accordance with the foregoing, suitable glass fibers for use in the present invention include glass fibers such as those disclosed in U.S. Pat. No. 4,838,643 for a "Single Mode Bend Insensitive Fiber for Use in Fiber Optic Guidance Applications" (Hodges et al.); U.S. Patent Application Publication No. US 2007/0127878 A1 and its related U.S. patent application Ser. No. 11/556,895 for a "Single Mode Optical Fiber" (de Montmorillon et al.); U.S. Pat. No. 7,587,111 and its related U.S. patent application Ser. No. 11/697,994 for a "Single-Mode Optical Fiber" (de Montmorillon et al.); U.S. Pat. No. 7,356,234 and its related U.S. patent application Ser. No. 11/743,365 for "Chromatic Dispersion Compensating Fiber" (de Montmorillon et al.); U.S. Pat. No. 7,555,186 and its related U.S. patent application Ser. No. 11/999,333 for an "Optical Fiber" (Flammer et al.); U.S. Patent Application No. 61/101,337 for a "Single Mode Optical Fiber" (de Montmorillon et al.); U.S. Patent Application No. 61/112,006 for a "Bend-Insensitive Single-Mode Optical Fiber" (de Montmorillon et al.); U.S. Patent Application No. 61/112,374 for a "Bend-Insensitive Single Mode Optical Fiber" (de Montmorillon et al.); U.S. patent application Ser. No. 12/436,423 for a "Single-Mode Optical Fiber Having Reduced Bending Losses" (de Montmorillon et al.); and U.S. patent application Ser. No. 12/436,484 for a "Bend-Insensitive Single-Mode Optical Fiber" (de Montmorillon et al.). Each of these commonly assigned patent documents is hereby incorporated by reference in its entirety.

Typically, the optical-fiber cable 10 includes six buffer tubes 14 (e.g., loose tubes). Optical-fiber cables 10 may include a plurality of buffer tubes 14 (e.g., between two and 12 buffer tubes 14).

The individual buffer tubes 14 are in close proximity to the other buffer tubes 14 and the central strength member 12. For example, in an optical-fiber cable 10 containing six buffer tubes 14, an individual buffer tube 14 may contact two adjacent buffer tubes 14, the central strength member 12, and the protective outer jacket 18 (i.e., the six buffer tubes 14 are positioned around the central strength member 12 as depicted in FIG. 1).

Typically, all of the buffer tubes 14 within a single optical-fiber cable 10 of the present invention have the same outer diameters and inner diameters. For example, if the optical-fiber cable 10 contains six buffer tubes 14, all six buffer tubes 14 have the same outer diameter and inner diameter. In one embodiment, the buffer tubes 14 have an outer diameter of three millimeters and an inner diameter of 2.2 millimeters.

Typically, the buffer tubes 14 are tubular (i.e., the cross-section of the buffer tubes 14 is a circle). In a possible embodiment, however, the buffer tubes 14 may be formed as quadrant portions of a circular cross-section, such that the buffer tubes 14 fill a relatively larger area between the central strength member 12 and the protective outer jacket 18 (e.g., each buffer tube 14 is shaped somewhat like a trapezoid in which its respective bases are arcs and/or chords).

The shapes of the buffer tubes 14 within a single optical-fiber cable 10 may vary (i.e., all of the buffer tubes 14 are not required to have the same shape). In some embodiments, the buffer tubes 14 may be formed as a so-called "slotted core" within the optical-fiber cable.

The optical fibers 16 may be distributed evenly among the buffer tubes 14 (i.e., each tube 14 contains an equal number of optical fibers 16). For example, an optical-fiber cable 10 containing 144 optical fibers 16 and six buffer tubes 14 may have 24 optical fibers 16 per buffer tube 14.

The buffer tubes 14 containing the optical fibers 16 may be stranded around the central strength member 12. For example, the buffer tubes 14 can be positioned externally adjacent to and stranded around the central strength member 12. The stranding can be accomplished in one direction, helically, known as "S" stranding, or Reverse Oscillated Lay stranding, known as "S-Z" stranding. Stranding about the central strength member 12 increases the operational and installation flexibility of the optical-fiber cable 10. S-Z stranding, for example, allows easy unraveling of the buffer tubes 14 for mid-span access.

In other embodiments, the buffer tubes 14 containing the optical fibers 16 are simply placed externally adjacent to the central strength member 12 (i.e., the buffer tubes 14 are not intentionally stranded or arranged around the central strength member 12 in a particular manner and run substantially parallel to the central strength member 12).

Optical-fiber cables 10 according to the present invention also include a protective outer jacket 18 provided around the buffer tubes 14 containing optical fibers 16. In some embodiments, the protective outer jacket 18 maintains a substantially uniform thickness over the length of the optical-fiber cable 10. The thickness of the protective outer jacket 18 may be adjusted to reduce or increase the overall diameter of the optical-fiber cable 10 or to provide greater protection to the optical-fiber cable 10. In a typical embodiment, the protective outer jacket 18 is 0.6 millimeter thick.

The protective outer jacket 18 may fit tightly around and conform to the outside of the other elements of the optical-fiber cable 10 (e.g. the buffer tubes 14) in such a way that it substantially fills the interstices (i.e., the gaps) between adjacent buffer tubes 14. See FIG. 2. In this particular embodiment, the protective outer jacket 18 is thin (e.g., 0.6 millimeter thick or so) so that the external surface of the optical-fiber cable 10 varies in distance from the center of the optical-fiber cable 10 (i.e., it is textured rather than smooth).

In some embodiments including a thin protective outer jacket 18, the buffer tubes 14 are stranded (e.g., S stranded or S-Z stranded) around the central strength member 12. In such embodiments, the textured outer surface of the optical-fiber cable 10 periodically varies lengthwise along the cable 10 in a manner that replicates the stranded shape of the underlying buffer tubes 14. The textured profile of the protective outer jacket 18 of this embodiment further improves the blowing performance of the optical-fiber cable 10. The textured surface reduces the contact surface between the cable 10 and the microduct and increases the friction between the blowing medium (e.g., air or liquid) and the cable 10.

The protective outer jacket 18 may be made of a low coefficient-of-friction material, which can facilitate blown installation. Yet, in other embodiments, the protective outer jacket 18 can be provided with a lubricant to further facilitate blown installation. The protective outer jacket 18 may include other materials known by those having ordinary skill in the art to be suitable for use as a protective outer jacket 18 (e.g., polymeric materials such as PVC or nylons).

FIG. 1 depicts a cross-sectional view of an exemplary embodiment of an optical-fiber cable 10 in accordance with the present invention. Those having ordinary skill in the art will appreciate that FIG. 1 is a schematic representation that is not necessarily drawn to scale.

In this embodiment, the optical-fiber cable 10 includes a central strength member 12 positioned at the middle of the optical-fiber cable 10. Buffer tubes 14 are provided externally adjacent to the central strength member 12. Each tube 14 contains an equal number of optical fibers 16. Finally, a protective outer jacket 18 is provided around the buffer tubes 14 and the central strength member 12.

As will be recognized by those having ordinary skill in the art, the optical fibers 16 are loosely placed in the buffer tubes 14. Because the optical fibers 16 typically bunch together within the buffer tubes 14, the optical fibers 16 are depicted in FIG. 1 as centrally located bundles within the buffer tubes 14. Those having ordinary skill in the art will recognize that this bundling sometimes occurs because a lubricant or release agent (e.g., silicone oil) may be applied to the optical fibers 16 during the manufacturing of the optical-fiber cable 10. The lubricant or release agent facilitates the removal of excess fiber length (EFL) during manufacturing and field operations. Despite this bundling, the optical-fiber cable 10 is considered to be a loose tube optical-fiber cable.

Figure 2:
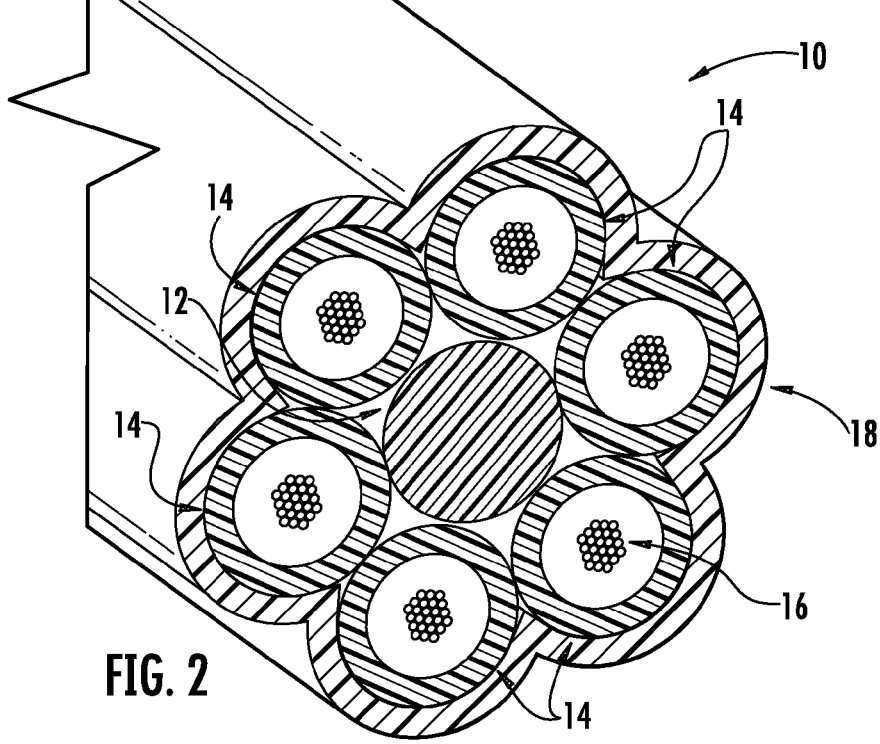
FIG. 2 schematically depicts a perspective, cross-sectional view of an exemplary embodiment of an optical-fiber cable in accordance with the present invention.

FIG. 2 schematically depicts a cross-sectional, perspective view of another exemplary embodiment of an optical-fiber cable in accordance with the present invention. Those having ordinary skill in the art will appreciate that FIG. 2 is a schematic representation that is not necessarily drawn to scale.

The embodiment depicted in FIG. 2 contains the same elements depicted in FIG. 1 (i.e. optical-fiber cable 10, buffer tubes 14, central strength member 12, optical fibers 16 (not shown in all buffer tubes 14), and protective outer jacket 18). In this embodiment, however, the protective outer jacket 18 fits tightly around and conforms to the outside of the buffer tubes 14 in such a way that it substantially fills the gaps between adjacent buffer tubes 14. In this particular embodiment, the protective outer jacket 18 is thin (e.g., 0.6 millimeter thick or so) so that the external surface of the optical-fiber cable 10 is textured rather than smooth.

EXAMPLE

Table 1 (below) compares a comparative optical-fiber cable to an exemplary optical-fiber cable of the present invention.

TABLE 1

|  | Inventive Cable | Comparative Cable |
|---|---|---|
| cable configuration |  |  |
| buffer tubes per cable | 6 | 12 |
| fibers per buffer tube | 24 | 12 |
| optical-fibers per cable | 144 | 144 |
| optical-fiber information |  |  |
| optical-fiber diameter (μm) | 242 | 242 |
| optical-fiber area (μm$^2$) | 45,996 | 45,996 |
| total optical-fiber area (mm$^2$) | 6.623 | 6.623 |
| buffer-tube information |  |  |
| tube outer diameter (mm) | 3 | 1.9 |
| tube inner diameter (mm) | 2.2 | 1.2 |
| buffer-tube area (mm$^2$) | 3.801 | 1.131 |
| total buffer-tube area (mm$^2$) | 22.808 | 13.572 |
| cable information |  |  |
| cable outer diameter (mm) | 10.5 | 11.1 |
| cable outer area (mm$^2$) | 86.590 | 96.769 |
| cable inner diameter (mm) | 9.3 | 9.9 |
| cable inner area (mm$^2$) | 67.929 | 76.977 |
| cable properties |  |  |
| cable filling coefficient (inner) | 0.098 | 0.086 |
| outer cable filling coefficient | 0.076 | 0.068 |
| cable fiber density (fibers/mm$^2$) | 1.663 | 1.488 |
| cumulative buffer tube filling coefficient | 0.290 | 0.488 |

Both optical-fiber cables depicted in Table 1 contain 144 optical fibers and were designed to be installed in a microduct having an inner diameter of 13 millimeters via blown installation.

As Table 1 shows, the optical-fiber cable according to one embodiment of the present invention has only six buffer tubes containing 24 optical fibers each in contrast to the comparative cable's 12 buffer tubes containing 12 fibers each. The tubes of the inventive optical-fiber cable possess larger inner and outer diameters than the buffer tubes of the comparative cable, yet the overall cable outer diameter is smaller than outer diameter of the comparative cable.

Table 1 also shows that the smaller outer diameter of the cable makes the optical-fiber cable more suitable for blown installation. The inventive cable's outer diameter is 80 percent of the inner diameter of the microduct, which, as previously stated, improves performance in long-distance blowing installations (e.g., 3,000 to 5,000 feet). Therefore, the inventive cable performs better in long-distance blowing installations than the comparative cable.

The inventive cable also possesses a significantly lower cumulative buffer-tube filling coefficient than the comparative cable due to the larger inner diameter of the buffer tubes and despite the greater number of fibers per buffer tube. Therefore, the inventive cable is more suitable for mid-span storage than the comparative cable.

Table 1 also shows that the inventive cable has significantly higher cable filling coefficients than the comparative cable. Therefore, the inventive cable more effectively increases the amount of information that can be passed through the cable while reducing the amount of space required for installation.

Finally, Table 1 shows that the inventive cable has a higher cable fiber density than the comparative cable. Therefore, the inventive cable provides a high fiber count while decreasing the amount of space required for installation.

Table 2 (below) illustrates other exemplary embodiments of the optical-fiber cable having six buffer tubes each enclosing 24 optical fibers, albeit using optical fibers of various total diameters. In other words, the inventive cable described in Table 1 may be filled with optical fibers having various diameters to yield the embodiments summarized I Table 2. In particular, each of the following representative fiber-optic cables has a 10.5-millimeter diameter, including a 0.6-millimeter jacket, and each buffer tube therein has a 3.0-millimeter diameter, including a 0.4-millimeter wall.

TABLE 2

|  | optical fiber diameter (μm) | | | | |
| --- | --- | --- | --- | --- | --- |
|  | 235 | 242 | 250 | 255 | 265 |
| cable filling coefficient (inner) | 0.092 | 0.098 | 0.104 | 0.108 | 0.117 |
| outer cable filling coefficient | 0.072 | 0.076 | 0.082 | 0.085 | 0.092 |
| cable fiber density (fibers/mm$^2$) | 1.663 | 1.663 | 1.663 | 1.663 | 1.663 |
| cumulative buffer tube filling coefficient | 0.274 | 0.290 | 0.310 | 0.322 | 0.348 |

Table 3 (below) illustrates other exemplary embodiments of the optical-fiber cable having six buffer tubes each enclosing 12 optical fibers, likewise using optical fibers of various total diameters. In particular, each of the following representative fiber-optic cables has a 10.5-millimeter diameter, including a 0.6-millimeter jacket, and each buffer tube therein has a 3.0-millimeter diameter, including a 0.4-millimeter wall. In effect, as compared with Table 2, Table 3 shows the effect of reducing the total number of optical fibers from 144 to 72.

TABLE 3

|  | optical fiber diameter (μm) | | | | |
| --- | --- | --- | --- | --- | --- |
|  | 235 | 242 | 250 | 255 | 265 |
| cable filling coefficient (inner) | 0.046 | 0.049 | 0.052 | 0.054 | 0.058 |
| outer cable filling coefficient | 0.036 | 0.038 | 0.041 | 0.042 | 0.046 |
| cable fiber density (fibers/mm$^2$) | 0.832 | 0.832 | 0.832 | 0.832 | 0.832 |
| cumulative buffer tube filling coefficient | 0.137 | 0.145 | 0.155 | 0.161 | 0.174 |

In another aspect, the invention embraces a method for installing an optical-fiber cable capable of mid-span storage and having a high fiber count and fiber packing density.

Typically, the optical-fiber cables of the present invention are installed in microducts via a blowing method. This method includes (i) providing a microduct having a starting point and an end point; (ii) guiding the optical-fiber cable from the starting point toward the end point (e.g., using a transfer medium); (iii) collecting the front end of the optical-fiber cable at the end point; and (iv) mechanically connecting the optical-fiber cable. Optionally, step (iii) further includes collecting (at the end point) the transfer medium employed (or water that is simply present) during the guiding (e.g., blowing) of the optical-fiber cable through the cable guide as set forth in step (ii).

The transfer medium used for the installation of the optical-fiber cable could be a gas (e.g., air) or other fluid. The transfer medium is pressurized within the microduct; inherent friction between the transfer medium and the optical-fiber cable forces the optical-fiber cable through the microduct.

Exemplary blowing installation methods and structures (e.g., plugs or pigs) are disclosed in the following commonly assigned patent documents, each of which is hereby incorporated by reference: U.S. Provisional Patent Application No. 60/969,401 for "Modified Pre-Ferrulized Communication Cable Assembly and Installation Method" (Griffioen et al.); U.S. Patent Application Publication No. US 2008/0317410 A1 and its related U.S. patent application Ser. No. 12/200,095 for a "Modified Pre-Ferrulized Communication Cable Assembly and Installation Method" (Griffioen et al.); and U.S. Pat. No. 7,574,095 and its related U.S. patent application Ser. No. 11/747,573 for a "Communication Cable Assembly and Installation Method" (Lock et al.).

In the specification and figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical-fiber cable, comprising:
   a plurality of buffer tubes positioned within a polymeric cable jacket, one or more of said buffer tubes enclosing a plurality of optical fibers;
   wherein the optical-fiber cable possesses a cable filling coefficient of at least about 0.085; and
   wherein one or more of said buffer tubes possesses a buffer-tube filling coefficient of less than about 0.4.

2. An optical-fiber cable according to claim 1, wherein as determined by the USDA Rural Electrification Administration mid-span temperature cycle test, (i) each said optical fiber that is enclosed within a buffer tube has increased attenuation of less than 0.1 dB and (ii) all said optical fibers enclosed within said buffer tubes have a mean increased attenuation of less than 0.05 dB.

3. An optical-fiber cable according to claim 1, wherein, in accordance with the GR-20-CORE mid-span standard, said optical fibers enclosed within said buffer tubes have a mean increased attenuation of less than 0.15 dB at a wavelength of 1550 nanometers.

4. An optical-fiber cable according to claim 1, wherein the optical-fiber cable possesses a cumulative buffer-tube filling coefficient of less than about 0.35.

5. An optical-fiber cable according to claim 1, wherein:
   the optical-fiber cable possesses a cable filling coefficient of at least about 0.095; and
   the optical-fiber cable possesses a cumulative buffer-tube filling coefficient of less than about 0.29.

6. An optical-fiber cable according to claim 1, wherein the optical-fiber cable possesses a cable fiber density of at least about 1.65 fibers/mm$^2$.

7. An optical-fiber cable according to claim 1, wherein each of said plurality of optical fibers enclosed within said one or more buffer tubes possesses a diameter of between about 235 microns and 265 microns.

8. An optical-fiber cable according to claim 1, wherein the optical-fiber cable possesses exactly six buffer tubes, each said buffer tube enclosing at least 24 optical fibers.

9. An optical-fiber cable according to claim 1, comprising a strength member centrally positioned within said polymeric cable jacket, wherein said plurality of buffer tubes (i) is positioned acentrically within said polymeric cable jacket and (ii) is stranded about said strength member.

10. An optical-fiber cable according to claim 1, wherein said plurality of optical fibers comprises single-mode optical fibers that meet the ITU-T G.652.D standard yet fail both the ITU-T G.657.A standard and the ITU-T G.657.B standard.

11. An optical-fiber cable according to claim 1, wherein said plurality of optical fibers comprises single-mode optical fibers that, at a wavelength of 1550 nanometers, possess spectral attenuation added losses of more than about 0.4 dB/km as measured in accordance with IEC TR62221, Method B (40-micron grade sandpaper).

12. An optical-fiber cable according to claim 1, wherein said plurality of optical fibers comprises bend-insensitive optical fibers that meet the ITU-T G.657.A standard and/or the ITU-T G.657.B standard.

13. A microcabling deployment, comprising an optical-fiber cable according to claim 1, wherein one or more sections of one or more of the buffer tubes are positioned within a pedestal, cabinet, or other optical-fiber enclosure, the one or more sections of the one or more buffer tubes being substantially free from the polymeric cable jacket.

14. An optical-fiber cable, comprising:
a plurality of buffer tubes positioned within a polymeric cable jacket, one or more of said buffer tubes enclosing a plurality of optical fibers;
wherein the optical-fiber cable possesses a cable fiber density of at least about 1.5 fibers/mm$^2$; and
wherein one or more of said buffer tubes possesses a buffer-tube filling coefficient of less than about 0.5.

15. An optical-fiber cable according to claim 14, wherein as determined by the USDA Rural Electrification Administration mid-span temperature cycle test, (i) each said optical fiber that is enclosed within a buffer tube has increased attenuation of less than 0.1 dB and (ii) all said optical fibers enclosed within said buffer tubes have a mean increased attenuation of less than 0.05 dB.

16. An optical-fiber cable according to claim 14, wherein:
the optical-fiber cable possesses a cable filling coefficient of at least 0.09; and
one or more of said buffer tubes possesses a buffer-tube filling coefficient of less than 0.35.

17. An optical-fiber cable according to claim 14, wherein:
the optical-fiber cable possesses a cable filling coefficient of at least about 0.10; and
the optical-fiber cable possesses a cumulative buffer-tube filling coefficient of less than about 0.33.

18. An optical-fiber cable according to claim 14, wherein:
the optical-fiber cable possesses a cable fiber density of at least about 1.65 fibers/mm$^2$; and
wherein the optical-fiber cable possesses a cumulative buffer-tube filling coefficient of less than about 0.35.

19. An optical-fiber cable according to claim 14, wherein the optical-fiber cable possesses at least 144 optical fibers.

20. An optical-fiber cable according to claim 14, comprising a strength member centrally positioned within said polymeric cable jacket, wherein said plurality of buffer tubes (i) is positioned acentrically within said polymeric cable jacket and (ii) is stranded about said strength member.

21. An optical-fiber cable according to claim 14, wherein said polymeric cable jacket possesses an outer profile that conforms to the configuration of the plurality of buffer tubes.

22. An optical-fiber cable according to claim 14, wherein said plurality of optical fibers comprises single-mode optical fibers that meet the ITU-T G.652.D standard yet fail the ITU-T G.657.A standard and/or the ITU-T G.657.B standard.

23. An optical-fiber cable according to claim 14, wherein said plurality of optical fibers comprises single-mode optical fibers that, at a wavelength of 1550 nanometers, possess spectral attenuation added losses of more than about 0.3 dB/km as measured in accordance with IEC TR62221, Method B (40-micron grade sandpaper).

24. An optical-fiber cable according to claim 14, wherein said plurality of optical fibers comprises single-mode optical fibers that, at wavelengths between 1200 nanometers and 1700 nanometers, possess spectral attenuation added losses of less than about 0.1 dB/km as measured in accordance with IEC TR62221, Method B (40-micron grade sandpaper).

25. A microcabling deployment, comprising an optical-fiber cable according to claim 14 positioned within a duct or microduct.

26. An optical-fiber cable, comprising:
a plurality of buffer tubes positioned within a polymeric cable jacket, one or more of said buffer tubes enclosing a plurality of optical fibers;
wherein the optical-fiber cable possesses a cable filling coefficient of at least about 0.045; and
wherein the optical-fiber cable possesses a cumulative buffer-tube filling coefficient of less than about 0.20.

27. An optical-fiber cable according to claim 26, wherein as determined by the USDA Rural Electrification Administration mid-span temperature cycle test, (i) each said optical fiber that is enclosed within a buffer tube has increased attenuation of less than 0.1 dB and (ii) all said optical fibers enclosed within said buffer tubes have a mean increased attenuation of less than 0.05 dB.

28. An optical-fiber cable according to claim 26, wherein the optical-fiber cable possesses a cable fiber density of at least about 0.8 fiber/mm$^2$.

29. An optical-fiber cable according to claim 26, comprising exactly six buffer tubes, each said buffer tube enclosing at least 12 optical fibers.

* * * * *